United States Patent
Yasaki et al.

(10) Patent No.: US 7,385,980 B2
(45) Date of Patent: Jun. 10, 2008

(54) NETWORK RELAY DEVICE

(75) Inventors: Kouichi Yasaki, Kawasaki (JP); Toshihiro Sonoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1207 days.

(21) Appl. No.: 10/284,117

(22) Filed: Oct. 31, 2002

(65) Prior Publication Data

US 2003/0223419 A1 Dec. 4, 2003

(30) Foreign Application Priority Data

May 31, 2002 (JP) .............................. 2002-159290

(51) Int. Cl.
*H04L 12/28* (2006.01)
*H04L 9/00* (2006.01)

(52) U.S. Cl. .................. 370/392; 370/401; 713/154
(58) Field of Classification Search ................ None
See application file for complete search history.

(56) References Cited

U.S. PATENT DOCUMENTS

| | | | | |
|---|---|---|---|---|
| 6,510,523 | B1* | 1/2003 | Perlman et al. | 709/225 |
| 6,944,154 | B2* | 9/2005 | Coupe et al. | 370/389 |
| 7,062,048 | B2* | 6/2006 | Livaditis et al. | 380/241 |
| 2001/0014093 | A1 | 8/2001 | Yoda et al. | |
| 2001/0039579 | A1* | 11/2001 | Trcka et al. | 713/201 |
| 2002/0165949 | A1* | 11/2002 | Na et al. | 709/223 |
| 2003/0131263 | A1* | 7/2003 | Keane et al. | 713/201 |
| 2005/0210533 | A1* | 9/2005 | Copeland et al. | 713/201 |

FOREIGN PATENT DOCUMENTS

| | | |
|---|---|---|
| JP | 07-146788 | 6/1995 |
| JP | 11-122198 | 4/1999 |
| JP | 2000-216830 | 8/2000 |
| JP | 2000-354034 | 12/2000 |
| JP | 2001-203761 | 7/2001 |
| JP | 2001-217834 | 8/2001 |
| JP | 2002-027012 | 1/2002 |
| JP | 2002-101115 | 4/2002 |

OTHER PUBLICATIONS

Japanese Patent Office Action, mailed Mar. 13, 2007, and issued in corresponding Japanese Patent Application No. 2002-159290.
Japanese Patent Office Action, dated Jan. 31, 2006.
Japanese Patent Office Action, mailed Jun. 5, 2007 and issued in corresponding Japanese Patent Application No. 2002-159290.

* cited by examiner

*Primary Examiner*—Andrew C. Lee
(74) *Attorney, Agent, or Firm*—Staas & Halsey LLP

(57) ABSTRACT

The network relay device includes a central processing unit that includes a routing unit that executes routing of packets received from a network; a storage unit that concurrently with the routing stores packets in a predetermined storage means; and an analysis commencement means that sets the analysis commencement timing for commencement of analysis of whether packets stored in a storage means are unauthorized infiltration data and based on this timing, causes the commencement of analysis of packets stored in the storage means, the analysis to be made by an unauthorized infiltration analysis means for determining whether packets are unauthorized infiltration data.

9 Claims, 7 Drawing Sheets

NETWORK RELAY DEVICE

BACKGROUND OF THE INVENTION

1. Field of the Invention

The present invention relates to a network relay device; more specifically, it relates to a network relay device capable of detecting unauthorized infiltration data, such device being a router that performs routing between external networks and internal networks.

2. Related Technology

When external networks such as the Internet and internal networks are connected, in order to transmit data to the appropriate destination, network relay devices are used to select a route and execute routing.

In such cases where external networks and internal networks are connected by such a relay device, a system is needed to prevent unauthorized infiltration from the external networks to the internal networks.

One system for preventing unauthorized infiltration from external networks is a firewall device, which is positioned between an external barrier segment that can be accessed from external networks and an internal segment to which a server and terminals that comprise internal networks are connected; when the firewall identifies an unauthorized packet that has arrived from an external source, it prevents unauthorized infiltration into the internal segment. The firewall function can be constituted so that, for example, the address of the sender of a TCP/IP packet, the destination address, and the port number are checked; packets with port numbers other than pre-registered port numbers are not allowed to pass.

In addition, in order to prevent unauthorized infiltration from external networks, a firewall may be constituted as a monitoring tool to monitor packet traffic flowing through a network and compare this against a previously prepared traffic pattern characteristic of unauthorized access; in the event that traffic corresponding to such traffic is detected, an alert is displayed, or the connection is cut off, or other such processing is conducted.

Of the above-described systems for preventing unauthorized infiltration from external networks, most are for corporate use; the object of such systems is to monitor packets transmitted from external networks in real time, and to detect and prevent unauthorized infiltration as quickly as possible. For this reason, in network relay devices such as routers that perform routing between external networks and internal networks, when they are given the function to prevent this kind of unauthorized infiltration, priority is given to detecting unauthorized infiltration, even at the expense of routing capability.

In households, too, always-on Internet connections have become commonplace, and thus systems not just for corporations but for households, too, have become necessary for preventing unauthorized infiltration from external networks. When the above-described systems for preventing unauthorized infiltration into corporate networks are used in routers designed for household use, there are problems in terms of cost performance, as the system will have unnecessarily high processing capabilities. Furthermore, because a household does not need the advanced anti-infiltration function needed by corporations, even if unauthorized infiltration analysis is carried out in real time for all packets, resulting in a degraded routing function, it is difficult to imagine that a superior infiltration prevention effect can be achieved.

SUMMARY OF THE INVENTION

It is an object of the present invention to provide a network relay device that performs routing and is capable of effectively analyzing whether there has been unauthorized infiltration, without loss of routing capability.

A network relay device of the present invention comprises a central processing unit that includes a routing unit that selects a route for a packet received from a network based on that packet's control information and routes that packet to the appropriate destination; a storage unit that concurrently with the routing by the routing unit stores packets to be routed in a predetermined storage means; and an analysis commencement means for setting the analysis commencement timing for commencement of analysis of whether or not a packet stored in the storage means is unauthorized infiltration data, and for causing, in accordance with this analysis commencement timing, an unauthorized infiltration analysis means for determining whether or not a packet stored in the storage means is unauthorized infiltration data to commence analysis of data stored in the storage means.

Here, the storage unit attaches an analysis flag to packets needing analysis by the unauthorized infiltration analysis means and stores such packets in the analysis means and the unauthorized infiltration analysis means analyzes only those packets with the analysis flags attached.

Likewise, the central processing unit comprises the unauthorized infiltration analysis means, and the analysis commencement means sets the time when the operating ratio of the central processing unit is at or below a predetermined value as the analysis commencement timing.

Further, the analysis commencement means includes an acceptance means for accepting input of instructions relating to analysis commencement timing and sets analysis commencement timing in accordance with inputted instructions accepted by the acceptance means.

The analysis commencement means acquires status information of terminals connected to the routing unit and sets the analysis commencement timing based on the status information of the terminals.

Likewise, at least one of the terminals connected to the routing unit comprises the unauthorized infiltration analysis means, and the analysis commencement means encapsulates packets stored in the storage means in accordance with analysis commencement timing and sends the same to a terminal having the unauthorized infiltration analysis means.

Further the storage unit comprises a hard disk interface and contains a hard disk drive as the storage means.

The storage means compresses the packets before storing the same in the storage means, and encodes the packets before storing the same in the storage means.

Likewise, a network relay device of the present invention comprises a central processing unit that includes a routing unit that selects a route for a packet received from a network based on that packet's control information and routes that packet to the appropriate destination, and an unauthorized infiltration analysis unit that analyzes whether or not received packets are unauthorized infiltration data; and an analysis interruption means for setting analysis not needed flags on packets for which analysis by the unauthorized infiltration analysis unit is unnecessary and for temporarily interrupting analysis by the unauthorized infiltration analysis unit.

From the following detailed description in conjunction with the accompanying drawings, the foregoing and other objects, features, aspects and advantages of the present invention will become readily apparent to those skilled in the art.

A BRIEF DESCRIPTION OF THE DRAWINGS

DESCRIPTION OF THE PREFERRED EMBODIMENTS

Outline of Constitution

Figure 1:
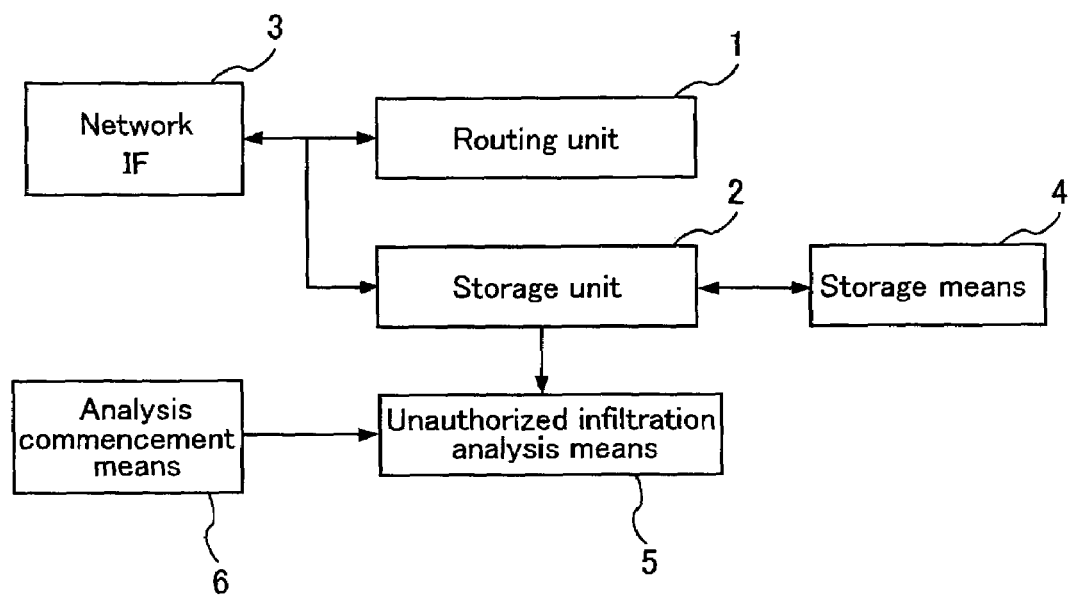
FIG. 1 is a block diagram showing a simplified constitution of the present invention.

An outline of the constitution of a network relay device in accordance with the present invention will be explained with reference made to FIG. 1.

This constitution includes a routing unit 1 that selects a route for packets received from a network interface 3 and routes the same to the appropriate destination based on such packet's control information; a storage unit 2 that stores packets in a storage means 4 concurrently with the routing performed by the routing unit 1; and an analysis commencement means 6 that sets analysis commencement timing for having an unauthorized infiltration analysis means 5 analyze packets stored in storage means 4.

This network relay device links external networks such as the Internet ("WAN") and internal networks ("LAN"); it is constituted to select routes for transmitting packets flowing within the respective networks for transmission to the intended destination. Thus the network interface 3 comprises a plurality of network interfaces for connection with the respective different networks.

This network relay device also may include a CPU comprising a microprocessor, and the routing unit 1 may be a function of this CPU.

The storage means 4 may be constituted by a hard disk drive installed in this network relay device. In such cases, the storage unit 2 can be constituted by a hard disk interface for storing in storage means 4 packets passing through the network interface 3.

The unauthorized infiltration analysis means 5 may be constituted as a function of the CPU 1. In such cases, the analysis commencement means 6 detects CPU open time and causes the unauthorized infiltration commencement means 5 to commence analysis.

First Embodiment

Figure 2:
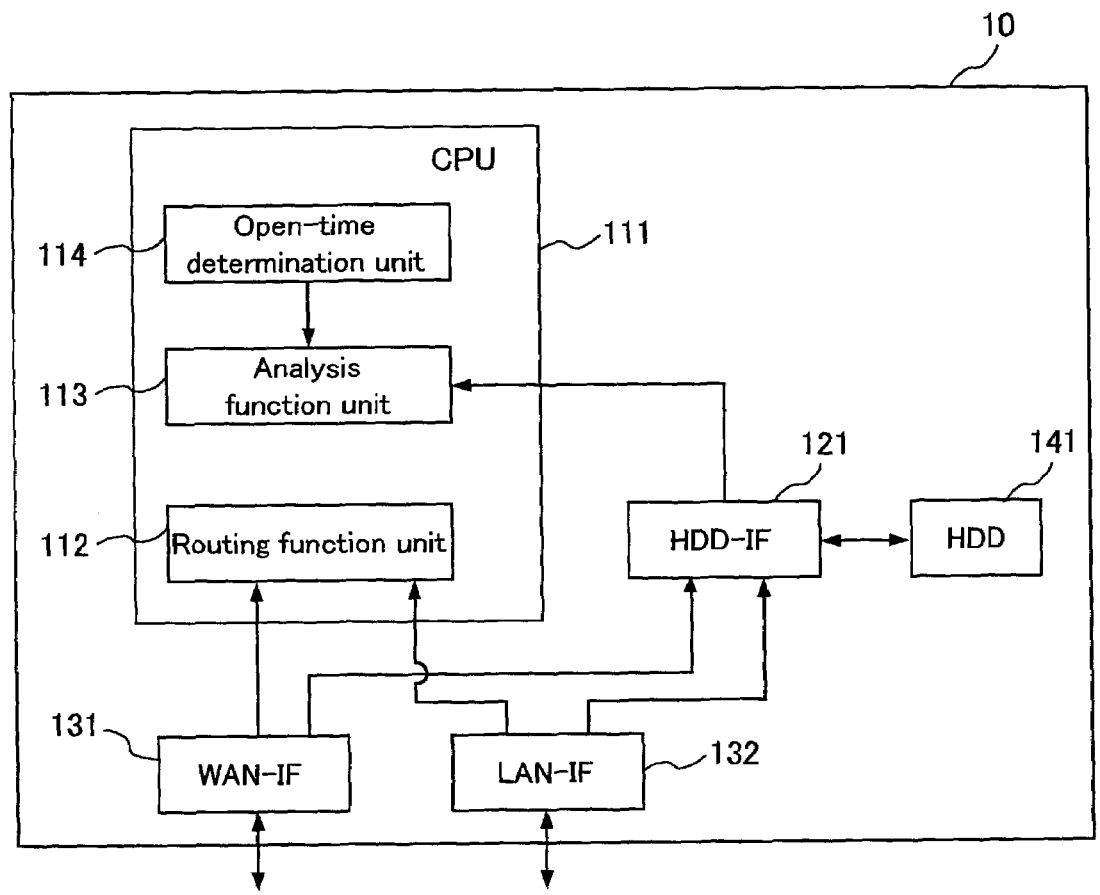
FIG. 2 is a control block diagram showing a first embodiment of the present invention.

A first embodiment of the present invention will be explained with reference made to FIG. 2.

In this first embodiment, a router 10 serves as the network relay device, relaying packets between external networks such as the Internet and internal networks such as a LAN.

The router 10 includes a CPU 111 for routing packets flowing in the external networks and the internal networks and executing other processing. This CPU 111 includes a routing function unit 112 for executing routing, an analysis function unit 113 for determining whether an unauthorized packet has infiltrated or not, and an open time determination means 114 for determining CPU open time.

The routing function unit 112 is actualized through the execution of an application allowing the CPU 111 to perform routing; in order to perform the relay of packets flowing through a WAN-IF 131 connected to external networks such as the Internet and a LAN-IF 132 connected to internal networks such as a LAN, it selects routes based on the destination address of packets and performs routing.

The WAN-IF 131 and the LAN-IF 132 transmit packets to the routing function unit 112 for routing, and they transmit these packets to a HDD-IF 121 for storage. The HDD-IF 121 is an interface for storing data on a hard disk drive ("HDD") 141 installed in the router 10 and for reading data stored on this HDD 141; for example, it may comprise an interface compatible with ATA, SCSI or other data transfer formats. Packets inputted into the routing unit 112 via the WAN-IF 131 or LAN-IF 132 are transmitted to the HDD-IF 121 and stored in succession on the HDD 141.

The analysis function unit 113 is actualized through the execution of an application allowing the CPU 111 to perform unauthorized infiltration analysis; it compares packets read by the HDD-IF 121 from the HDD 141 with a pre-prepared traffic pattern characteristic of unauthorized access, and performs unauthorized infiltration analysis to determine whether there has been unauthorized infiltration.

The open-time determination unit 114, for example, acquires current CPU 111 operating ratio information from an application that determines the CPU 111 operating ratio, and in cases where this operating ratio is at or below a predetermined value, it determines that it is open time for the CPU 111 and causes the analysis function unit 113 to execute unauthorized infiltration analysis.

In the first embodiment of the present invention thus constituted, routing to the destination address of packets flowing between external networks and internal networks is carried out by the routing function unit 112 contained in the CPU 111, and packets are stored in the HDD 141 via the HDD-IF 121; thus hardware resources used in routing do not need to be diverted for use in unauthorized infiltration analysis, and routing can be executed without any degradation of routing capability.

In addition, the CPU 111 open time is determined by the open-time determination unit 114, and in cases where it has been determined that it is open-time packets stored on the HDD 141 are read, and analysis is made of whether there has been unauthorized infiltration among the packets to be routed; thus while the reliability of security may suffer in comparison with cases of real-time unauthorized infiltration analysis, unauthorized infiltration can be addressed swiftly.

Analysis Flags

The HDD-IF 121 can be constituted so that, when it stores in the HDD 141 packets that have passed through the WAN-IF 131 or the LAN-IF 132, it attaches analysis flags to the packets and then stores them.

In such cases the CPU 111 executes unauthorized infiltration analysis using the analysis function unit 113 only for those packets to which an analysis flag has been attached.

Figure 3:
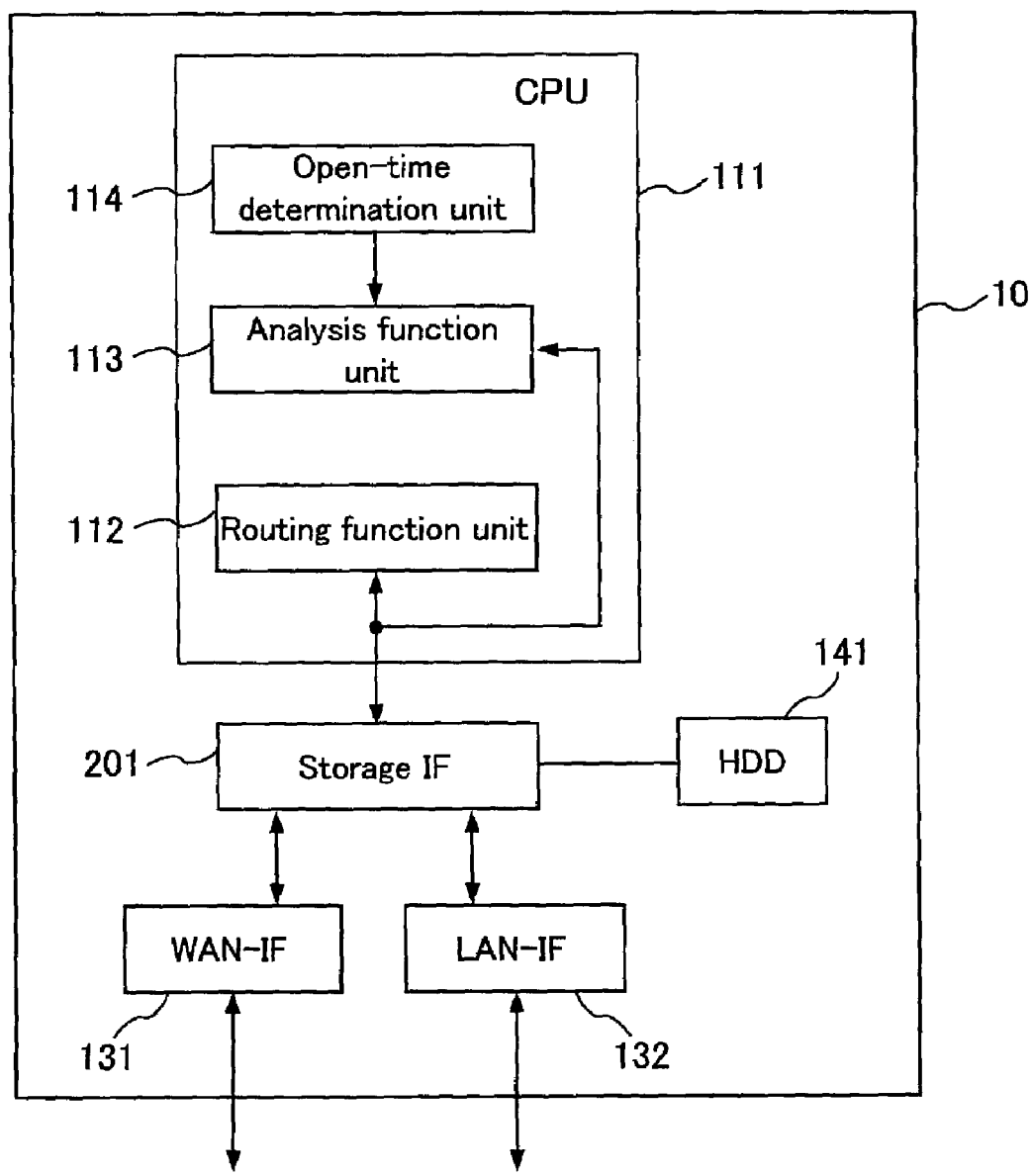
FIG. 3 is a control block diagram showing a variation of the first embodiment.

As shown in FIG. 3, with such a constitution, packets from the WAN-IF 131 and the LAN-IF 132 are all transmitted to the CPU 111 via a storage interface 201. In such cases the storage interface 201 includes a hard disk interface capable of transmitting data with the HDD 141.

The storage interface 201 attaches analysis flags to those packets that pass through it and are to be stored in the HDD 141, and stores them in the HDD 141; for example, it may be constituted to attach analysis flags only to packets received from the WAN-IF 131.

The CPU 111 may be constituted to execute unauthorized infiltration analysis using the analysis function unit 113 only for those packets received from the storage interface 201 that have analysis flags attached, and to execute routing for all other packets using the routing function unit 112.

With such a constitution, the input/output pin count of the CPU 111 can be reduced, the wiring reduced, and the work involved in making connections reduced.

In addition, by attaching analysis flags only to packets received through the WAN-IF 131, unauthorized infiltration analysis for packets transmitted from the internal networks to external networks via the LAN-IF 132 can be omitted, reducing the load on the CPU 111.

Furthermore, the analysis function unit 113 can be realized by an application that includes both a program that executes unauthorized infiltration analysis in real time and a program that executes unauthorized infiltration analysis for data temporarily stored on the HDD 141, meaning that resources can be conserved and maintainability improved.

Detection of Open Time

This router 10 may be provided with a commencement button that a user will use to give instructions to commence unauthorized infiltration analysis. In such cases, when a user, by operating the commencement button, gives instruction to commence analysis, the open-time determination unit 114 accepts these instruction signals and instructs the analysis function unit 113 to commence unauthorized infiltration analysis. The analysis function unit 113 reads packets stored in the HDD 141 via the storage interface 201 and executes unauthorized infiltration analysis.

A constitution is possible such that in cases where a user sends predetermined data through the LAN-IF 132, the open-time determination unit 114 determines that it is time for commencement of unauthorized infiltration analysis. For example, an analysis commencement button is set up on a web page on the router 10; when a user operates this analysis commencement button, the open-time determination unit 114 receives analysis commencement instruction signals via the storage interface 201 and causes the analysis function unit 113 to commence unauthorized infiltration analysis.

Further, the open-time determination unit 114 can be given an internal scheduler; when a preset analysis commencement time is reached, the open-time determination unit 114 causes the analysis function unit 113 to commence unauthorized infiltration analysis. The analysis commencement times set in the scheduler may be times that a user can set, or times when routing demands are deemed to be low may be set as default values for analysis commencement times.

With such a constitution, the open-time determination unit 114 can be achieved with a simple constitution, without any danger of adversely affecting user convenience.

Figure 4:
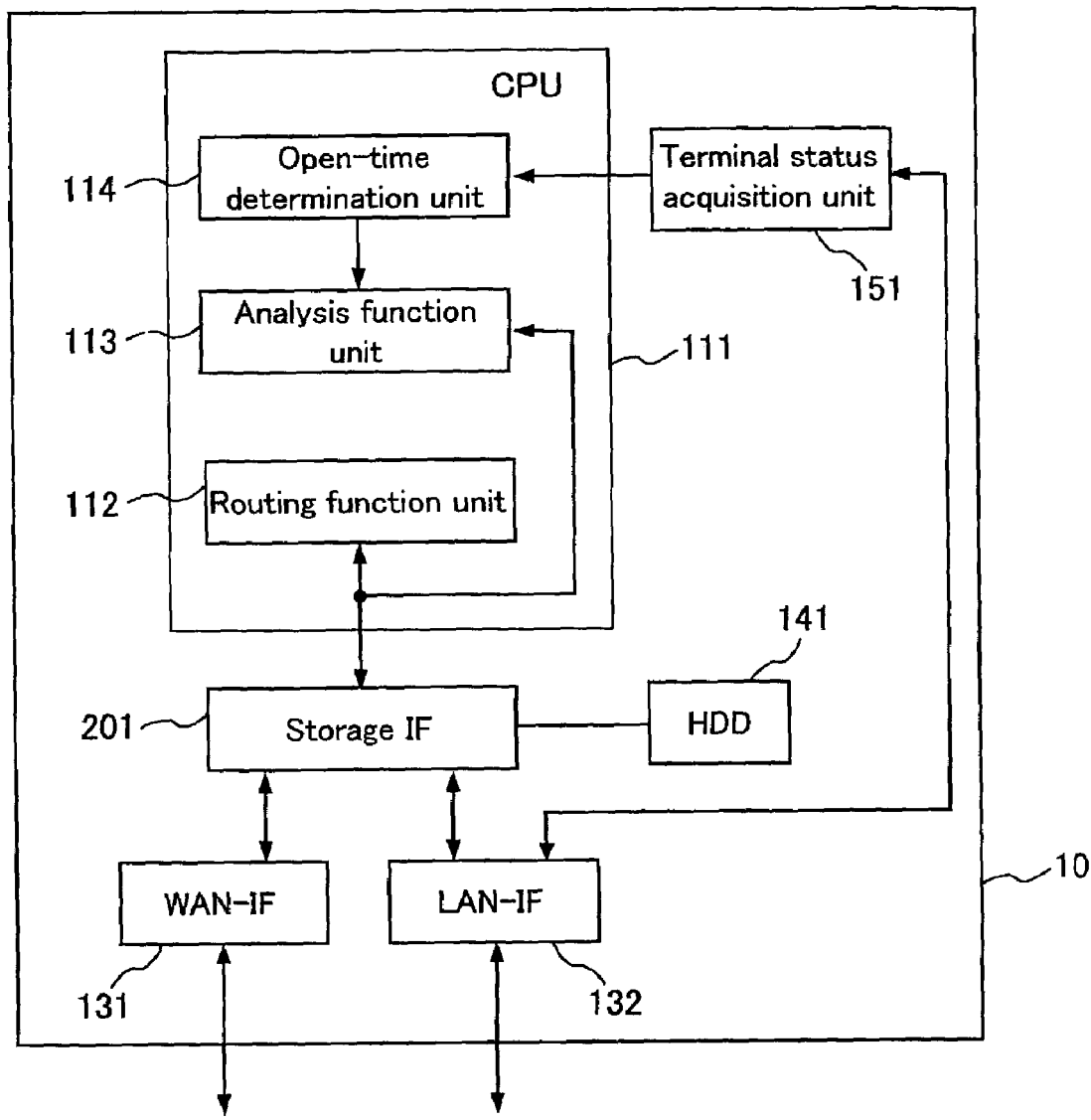
FIG. 4 is a control block diagram showing another variation of the first embodiment.

Further, as shown in FIG. 4, a constitution may include a terminal status acquisition unit 151 that acquires and manages status information of the terminals connected to the LAN-IF 132. This terminal status acquisition unit 151 sends packet at set intervals to terminals connected to the router 10 via the LAN-IF 132; when there is no response, it determines that the relevant terminal is not active and stores this status information in a predetermined region. For example, in cases where IP addresses have been allocated to terminals connected to the router 10 using DHCP (Dynamic Host Configuration Protocol), the router 10 uses ping (Packet Internet Groper) to send an ICMP (Internet Control Message Protocol) packet at set time intervals to the IP addresses allocated by DHCP. When a terminal does not respond to this packet, the open-time determination unit 114 determines that there is no terminal accessing external networks through the router 10, and instructs the analysis function unit 113 to commence unauthorized infiltration analysis.

With such a constitution, the statuses only of terminals to which an IP address has been allocated by DNCP will be checked, and unauthorized infiltration analysis is executed depending on terminal status.

Second Embodiment

Figure 5:
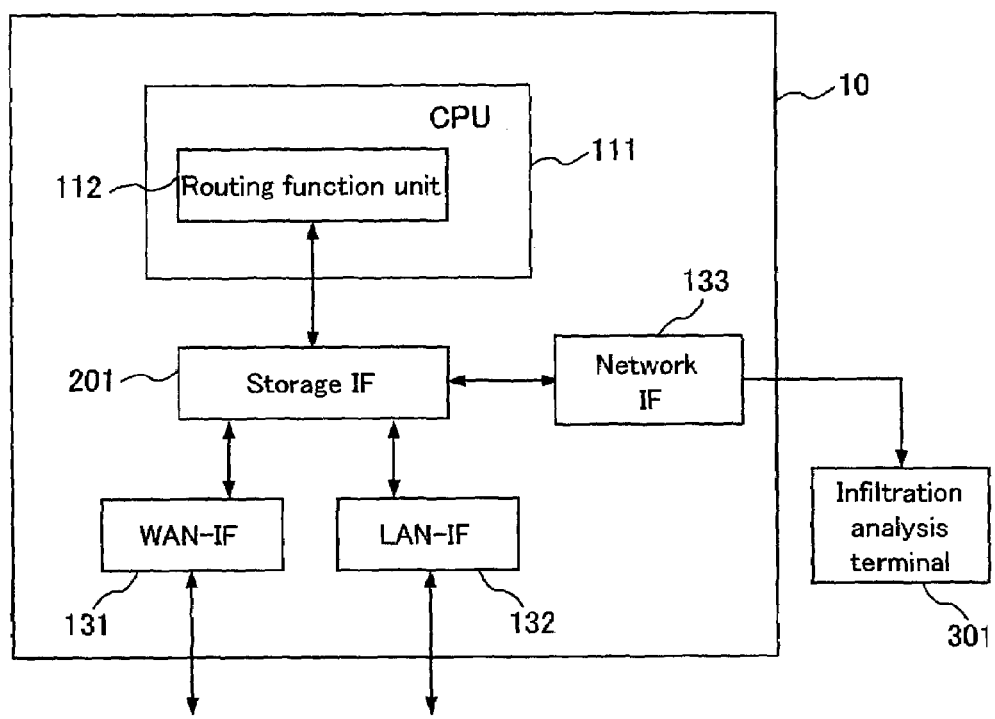
FIG. 5 is a control block diagram showing a second embodiment of the present invention.

A second embodiment of the present invention will be explained with reference made to FIG. 5.

The router 10 includes the CPU 111, which includes the routing function unit 112 for executing routing; the WAN-IF 131, which is connected to external networks such as the Internet; the LAN-IF 132 connected to internal networks such as a LAN; and the storage interface 201, which sends to the routing function unit 112 packets to be transmitted to or received from the WAN-IF 131 or the LAN-IF 132.

As with the first embodiment, the routing function unit 112, in order to relay packets flowing between external networks and internal networks, selects a route based on a packet's destination address and then routes that packet.

The WAN-IF 131 and the LAN-IF 132 send packets to the routing function unit 112 via the storage interface 201 for routing.

The storage interface 201 transfers packets between the WAN-IF 131 and LAN-IF 132 and the routing function unit 112; after assembling these packets, rewriting the address and otherwise encapsulating them, it fragments them and sends them to a terminal for an infiltration analysis terminal 301 connected to the router 10.

The infiltration analysis terminal 301 comprises a standard personal computer onto which an unauthorized infiltration analysis application has been loaded; it is connected to the storage interface 201 via a network interface 133 within the router 10. The network interface 133 may share use of the LAN-IF 132, or it may be constituted by an interface that only forwards data between the router 10 and the infiltration analysis terminal 301.

The infiltration analysis terminal 301 executes unauthorized infiltration analysis of packets sent from the storage interface 201 of the router 10, and sends to the router 10 the results of such analysis. The infiltration analysis terminal 301 may be constituted to execute unauthorized infiltration analysis in succession of packets as they arrive, or it may be constituted to store packets that arrive on a hard disk or the like and to commence unauthorized infiltration analysis according to a predetermined analysis commencement timing. The analysis commencement timing may be (1) the time when an operator of the infiltration analysis terminal operates a predetermined button; (2) the time when a predetermined packet is received from a user or the router 10; (3) a commencement timing set by an internal scheduler; or other conceivable trigger.

With such a constitution, the analysis function unit for executing unauthorized infiltration analysis is separated from the CPU 111 of the router 10, leading to an increase in the resources available to the CPU 111 and meaning that there is no loss in processing capability of the routing function unit 112. In addition, the unauthorized infiltration analysis of packets routed by the routing function unit 112 can be carried out in greater detail by the infiltration analysis terminal 301, which is used exclusively for unauthorized infiltration analysis, meaning that it can detect unauthorized infiltration coming in a great variety of attack patterns.

Third Embodiment

Figure 6:
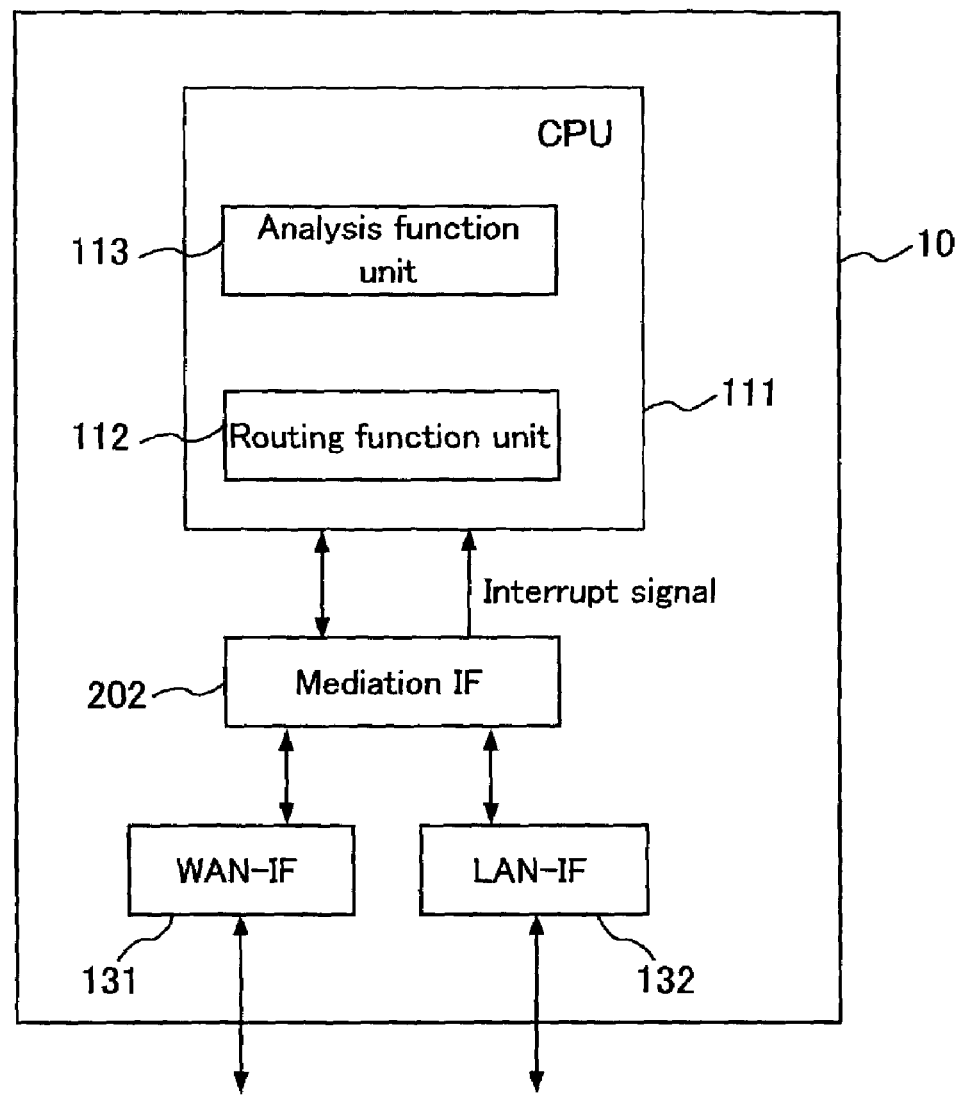
FIG. 6 is a control block diagram showing a third embodiment of the present invention.

A third embodiment of the present invention will be explained with reference made to FIG. 6.

The router 10 includes the CPU 111, the WAN-IF 131, the LAN-IF 132 and a mediation IF 202. The CPU 111 includes the routing function unit 112 for executing routing and the analysis function unit 113 for unauthorized infiltration analysis of packets to be routed by the routing function unit 112. The WAN-IF 131, which is connected to external networks such as the Internet, and the LAN-IF 132, which is connected to internal networks such as a LAN, are connected to the mediation interface 202, which transmits to and from the CPU 111 packets received from or to be sent to the WAN-IF 131 or the LAN-IF 132.

As with the first embodiment, the routing function unit 112, in order to relay packets flowing between external networks and internal networks, selects a route based on a packet's destination address and then routes that packet.

The analysis function unit 113 executes an application for unauthorized infiltration analysis in order to execute real-time unauthorized infiltration analysis of packets to be routed by the routing function unit 112.

The mediation interface 202 mediates between the network interfaces and the CPU 111 for the transfer of packets received or to be sent via the WAN-IF 131 or the LAN-IF 132. The mediation interface 202 is constituted so that when it receives a predetermined packet, it sends an interrupt signal to the CPU 111 to have unauthorized infiltration analysis by the analysis function unit 113 interrupted.

For example, in cases where a packet from the LAN-IF 132 has a specified address, the mediation interface 202 attaches an interrupt flag to this packet and sends it along to the CPU 111. The CPU 111 interrupts unauthorized infiltration analysis by the analysis function unit 113 from the time that it receives a packet with an interrupt flag attached until a set amount of time has elapsed.

With such a constitution, a user wanting high-speed processing of packets can interrupt real-time unauthorized infiltration analysis by the analysis function unit 113 to increase processing speed.

It should be noted that a constitution is possible whereby the mediation interface 202 is given the HDD interface function, and packets for which unauthorized infiltration analysis by the analysis function unit 113 has been interrupted are stored in the HDD, and when the CPU 111 has open time unauthorized infiltration analysis is executed. Further, a constitution is possible whereby the mediation interface 202 is connected to the unauthorized infiltration analysis terminal via a network interface, and packets for which unauthorized infiltration analysis has been interrupted are sent to the unauthorized infiltration analysis terminal, which executes unauthorized infiltration analysis.

Fourth Embodiment

Figure 7:
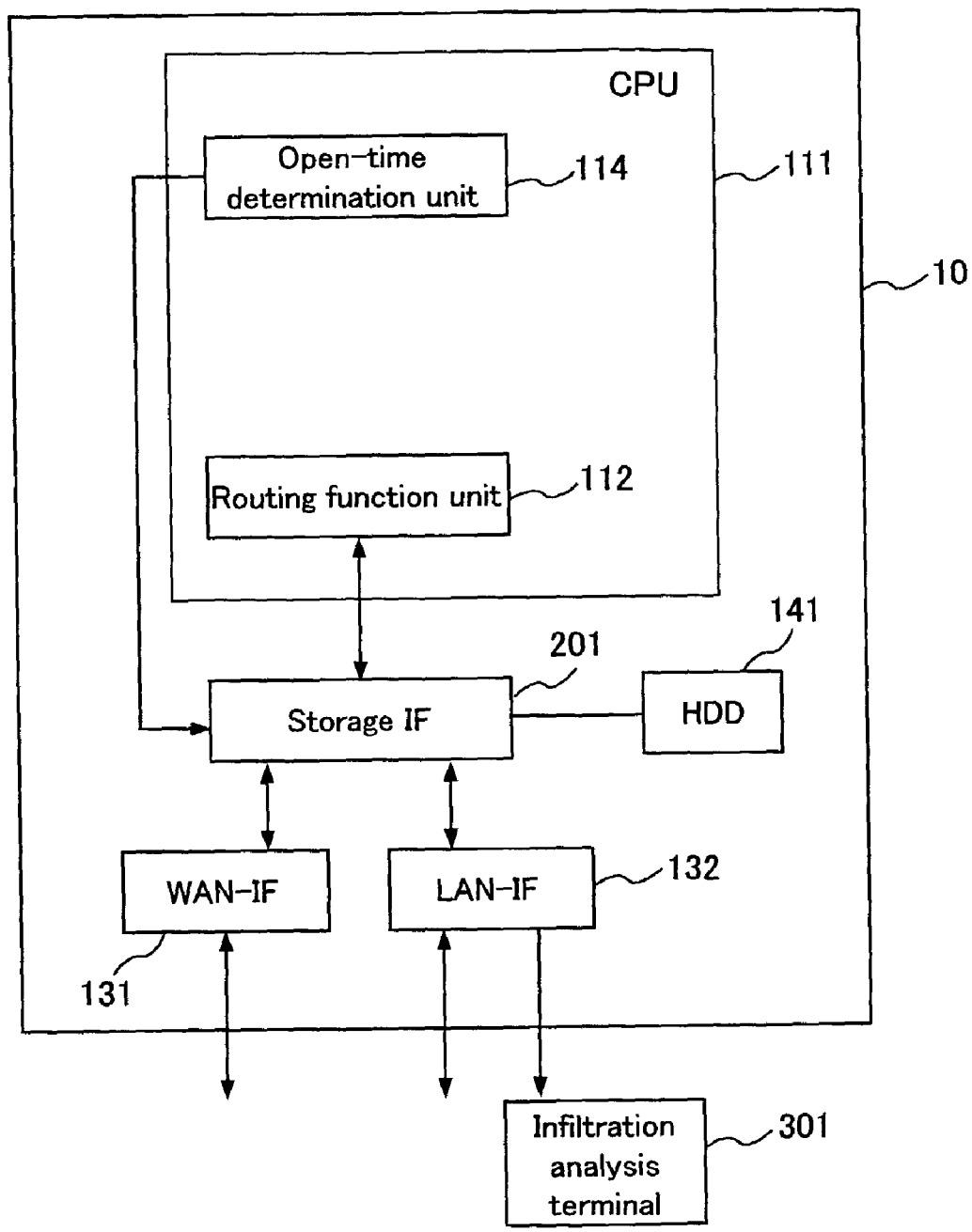
FIG. 7 is a control block diagram showing a fourth embodiment of the present invention.

A fourth embodiment of the present invention will be explained with reference made to FIG. 7.

The router 10 includes the CPU 111, which includes the routing function unit 112 for executing routing; the WAN-IF 131, which is connected to external networks such as the Internet; the LAN-IF 132, which is connected to internal networks such as a LAN; and the storage interface 201, which sends to the routing function unit 112 packets that have arrived or are to be sent through the WAN-IF 131 or the LAN-IF 132.

The routing function unit 112, in order to relay packets flowing between external networks and internal networks, selects a route based on a packet's destination address and then routes that packet.

The WAN-IF 131 and the LAN-IF 132 send packets to the routing function unit 112 via the storage interface 201 for routing.

The storage interface 201 transfers packets between the WAN-IF 131 and the LAN-IF 132 and the routing function unit 112, and stores these packets in the HDD 141. Packets stored in the HDD 141 can be all packets other than payload, and can be compressed and/or encoded.

The open-time determination unit 114, as in the previous embodiments, determines analysis commencement timing in accordance with user operation of a button, a predetermined packet sent from a user, a time preset by a scheduler, status information of connected terminals, or other condition, and sends a commencement timing signal to the storage interface 201.

The storage interface 201 is connected to the infiltration analysis terminal 301 via the LAN-IF 132 or some other network interface; when it receives a commencement timing signal from the open-time determination unit 114, it reads packets stored on the HDD 141, and after assembling and encapsulating packets, fragments them and sends them to the infiltration analysis terminal 301.

The infiltration analysis terminal 301 comprises a standard personal computer onto which an application for unauthorized infiltration analysis has been loaded; it executes unauthorized infiltration analysis of packets sent from the storage interface 201 and sends those analysis results to the router 10.

With such a constitution, because stored packets are forwarded to the infiltration analysis terminal 301 when it is determined that the CPU 111 has open time, and this unauthorized infiltration analysis terminal 301 executes the unauthorized infiltration analysis, even if a low-spec CPU is used as the CPU 111, there is no loss in routing capability.

With the present invention, a network relay device is provided that is capable of efficiently analyzing whether or not there has been unauthorized infiltration, without any loss in routing capability.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A network relay device comprising:
   a central processing unit that includes a routing unit that selects a route for a packet received from a network based on that packet's control information and routes that packet to the appropriate destination;
   a storage unit that concurrently with the routing by said routing unit stores packets to be routed in a predetermined storage means; and
   an analysis commencement means for setting the analysis commencement timing for commencement of analysis of whether or not a packet stored in said storage means is unauthorized infiltration data, and for causing, in accordance with this analysis commencement timing, unauthorized infiltration analysis means for determining whether or not a packet stored in said storage means is unauthorized infiltration data to commence analysis of data stored in said storage means.

2. A network relay device of claim 1, wherein said storage unit attaches an analysis flag to packets needing analysis by said unauthorized infiltration analysis means and stores such packets in said analysis means and said unauthorized infiltration analysis means analyzes only those packets with said analysis flags attached.

3. A network relay device according to claim 1, wherein said central processing unit comprises said unauthorized infiltration analysis means, and said analysis commencement means sets the time when the operating ratio of said central processing unit is at or below a predetermined value as the analysis commencement timing.

4. A network relay device of claim 1, wherein said analysis commencement means includes an acceptance means for accepting input of instructions relating to analysis commencement timing and sets analysis commencement timing in accordance with inputted instructions accepted by said acceptance means.

5. A network relay device of claim 1, wherein said analysis commencement means acquires status information of terminals connected to said routing unit and sets said analysis commencement timing based on the status information of the terminals.

6. A network relay device of claim 1, wherein at least one of the terminals connected to said routing unit comprises said unauthorized infiltration analysis means, and said analysis commencement means encapsulates packets stored in said storage means in accordance with analysis commencement timing and sends the same to a terminal having said unauthorized infiltration analysis means.

7. A network relay device of claim 1, wherein said storage unit comprises a hard disk interface and contains a hard disk drive as said storage means.

8. A network relay device of claim 7, wherein said storage means compresses said packets before storing the same in said storage means.

9. A network relay device of claim 7, wherein said storage means encodes said packets before storing the same in said storage means.

* * * * *